(12) United States Patent
Ciamarra et al.

(10) Patent No.: US 10,557,366 B2
(45) Date of Patent: Feb. 11, 2020

(54) BOAS HAVING RADIALLY EXTENDED PROTRUSIONS (71) Applicant: UNITED TECHNOLOGIES CORPORATION, Farmington, CT (US)

(72) Inventors: Christina G Ciamarra, Kittery, ME (US); Brian Barainca, Kennebunk, ME (US); Thurman Carlo Dabbs, Dover, NH (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 213 days.

(21) Appl. No.: 15/863,152

(22) Filed: Jan. 5, 2018

(65) Prior Publication Data
US 2019/0211701 A1    Jul. 11, 2019

(51) Int. Cl.
| F01D 11/08 | (2006.01) |
| F01D 25/24 | (2006.01) |
| F16J 15/08 | (2006.01) |
| F16J 15/44 | (2006.01) |
| F01D 5/12 | (2006.01) |

(52) U.S. Cl.
CPC ............ *F01D 11/08* (2013.01); *F01D 25/246* (2013.01); *F16J 15/0887* (2013.01); *F16J 15/44* (2013.01); *F01D 5/12* (2013.01); *F01D 25/24* (2013.01); *F05D 2220/32* (2013.01); *F05D 2240/11* (2013.01)

(58) Field of Classification Search
CPC . F01D 11/08; F01D 5/12; F01D 25/24; F01D 25/246; F16J 15/44; F16J 15/0887; F05D 2220/32; F05D 2240/11
See application file for complete search history.

(56) References Cited

U.S. PATENT DOCUMENTS

| 7,033,138 B2* | 4/2006 | Tomita ................... F01D 11/005 415/139 |
| 9,103,225 B2* | 8/2015 | Lutjen ..................... F01D 11/08 |
| 9,677,412 B2 | 6/2017 | Jones et al. |
| 2010/0074745 A1* | 3/2010 | Jones ...................... F01D 11/24 415/209.3 |
| 2011/0044802 A1* | 2/2011 | Di Paola ................... F01D 9/04 415/173.1 |
| 2012/0189426 A1* | 7/2012 | Thibodeau ............... F01D 11/08 415/1 |
| 2016/0312661 A1* | 10/2016 | Duguay ................ F01D 25/246 |

* cited by examiner

Primary Examiner — Richard A Edgar
Assistant Examiner — Joshua R Beebe
(74) Attorney, Agent, or Firm — Snell & Wilmer, L.L.P.

(57) ABSTRACT

A blade outer air seal may comprise an arcuate segment. The arcuate segment may comprise an aft wall having a first radially extending protrusion at a circumferential end of the aft wall. A first hook may extend aft from the aft wall. A first gusset may extend from the first radially extending protrusion. A radial height of the first radially extending protrusion may be greater than a radial height of a second radially extending protrusion of the aft wall.

13 Claims, 5 Drawing Sheets

BOAS HAVING RADIALLY EXTENDED PROTRUSIONS

FIELD

The present disclosure relates to blade outer air seals for gas turbine engines and, more specifically, to blade outer air seals having radially extended protrusions.

BACKGROUND

A gas turbine engine typically includes a fan section, a compressor section, a combustor section, and a turbine section. The fan section may drive air along a bypass flowpath while the compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. Blade outer air seals (BOAS) may be mounted within the engine casing and positioned in close proximity to the outermost tips of the rotatable blades. Should a blade disengage or otherwise become loose it may be desirable to have a portion of the BOAS in close proximity to the engine casing structure.

SUMMARY

A blade outer air seal for a gas turbine engine is disclosed herein. In accordance with various embodiments, the blade outer air seal may comprise a plurality of arcuate segments. A first arcuate segment of the plurality of arcuate segments may comprise a first wall located at an aft end of the first arcuate segment. The first wall may comprise a first radially extending protrusion at a first circumferential end of the first wall, and a second radially extending protrusion at a second circumferential end of the first wall opposite the first circumferential end of the first wall. A first hook may extend aft from the first wall. A first gusset may extend from the first radially extending protrusion.

In various embodiments, a radial height of the first gusset as measured from a radially inward surface of the first arcuate segment may be between 50% and 70% of a radial height of the first radially extending protrusion as measured from the radially inward surface of the first arcuate segment. In various embodiments, a circumferential width of the first gusset may be between 20% and 40% of a circumferential width of the first radially extending protrusion.

In various embodiments, the first wall may further comprise a plurality of third radially extending protrusions disposed between the first radially extending protrusion and the second radially extending protrusion. A radial height of the first radially extending protrusion and the second radially extending protrusion as measured from a radially inward surface of the first arcuate segment may be greater than a radial height of the third radially extending protrusions as measured from the radially inward surface of the first arcuate segment. A radially outward surface of the first hook may be radially inward of a midpoint of the first wall. The midpoint of the first wall being located halfway between the radially inward surface of the first arcuate segment and a radially outward surface of the third radially extending protrusions.

In various embodiments, the first arcuate segment may further comprise a second wall located at a forward end of the first arcuate segment A second hook may extend from the second wall. The first arcuate segment may further comprise a feather seal slot defined, at least partially, by the first wall, the second wall, and a circumferential surface extending between the first wall and the second wall.

In various embodiments, a second arcuate segment of the plurality of arcuate segments may be disposed circumferentially adjacent to the first arcuate segment. An aft wall of the second arcuate segment may comprise a third radially extending protrusion located at a circumferential end of the aft wall. The third radially extending protrusion may be circumferentially adjacent to the first radially extending protrusion. A feather seal may be disposed between the first arcuate segment and the second arcuate segment.

A gas turbine engine is also disclosed herein. In accordance with various embodiments, the gas turbine engine may comprise engine casing structure and a turbine disposed radially inward of the engine casing structure. The turbine may comprise a blade configured to rotate about a central longitudinal axis of the gas turbine engine, and a blade outer air seal disposed radially outward of the blade. The blade outer air seal may comprise an arcuate segment. A first radial distance between the engine casing structure and a first protrusion extending from an aft wall of the arcuate segment may be less than a second radial distance between the engine casing structure and a second protrusion extending from the aft wall of arcuate segment.

In various embodiments, the first protrusion may be located proximate a circumferential end of the arcuate segment. The blade outer air seal may further comprise a gusset extending from the aft wall. A radial length of the gusset as measured from a radially inward surface of the arcuate segment may be between 50% and 70% of a radial length of the first protrusion as measured from the radially inward surface of the first arcuate segment.

In various embodiments, a hook may extend from the aft wall of the arcuate segment. A radially outward surface of the hook may radially inward of a midpoint of the aft wall. The midpoint being located halfway between a radially inward surface of the arcuate segment and a radially outward surface of the second protrusion.

A turbine for a gas turbine engine is also disclosed herein. In accordance with various embodiments, the turbine may comprise a blade and a blade outer air seal disposed radially outward of the blade. The blade outer air seal may comprise a first radially extending protrusion and a second radially extending protrusion. A turbine case may be disposed around the blade outer air seal. The turbine case may comprise a case hook. A first radial distance between the case hook and the first radially extending protrusion may be less than a second radial distance between the case hook and the second radially extending protrusion.

In various embodiments, the blade outer air seal may further comprise a gusset extending from the first radially extending protrusion.

In various embodiments, the blade outer air seal may comprise an arcuate segment. The first protrusion may be located proximate a circumferential end of an aft wall of the arcuate segment. An aft hook may extend aft from the aft wall of the arcuate segment. A radially outward surface of the aft hook may be radially inward of a midpoint of the aft wall. The midpoint being located halfway between a radially inward surface of the arcuate segment and a radially outward surface of the second protrusion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
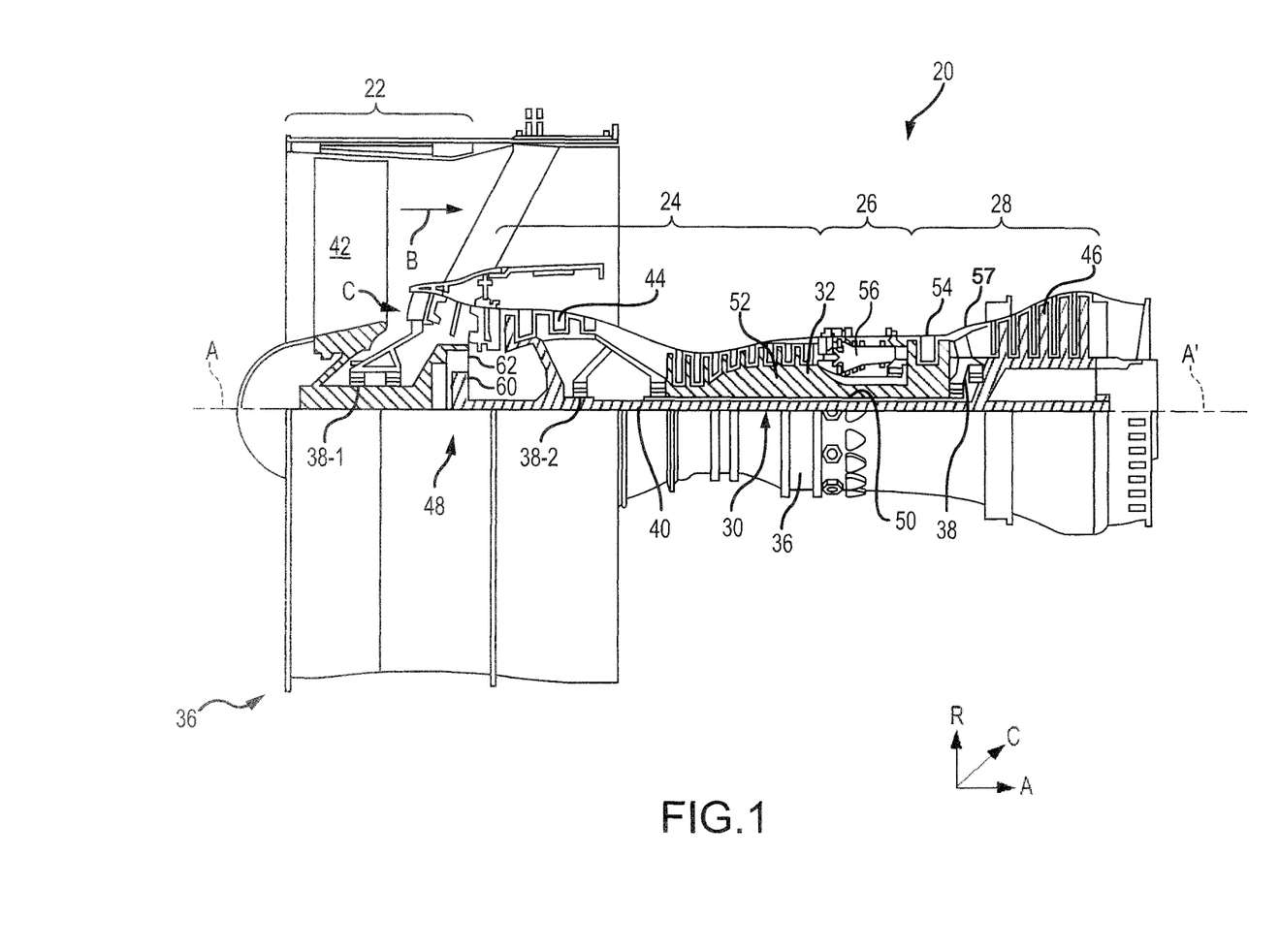
FIG. 1 illustrates a cross-sectional view of an exemplary gas turbine engine, in accordance with various embodiments.

With reference to FIG. 1, a gas turbine engine 20 is illustrated, in accordance with various embodiments. An A-R-C axis has been included to illustrate the axial (A), radial (R), and circumferential (C) directions. For clarity, axial axis A spans parallel to engine central longitudinal axis A-A'. Gas turbine engine 20 may be a two-spool turbofan that generally incorporates a fan section 22, a compressor section 24, a combustor section 26, and a turbine section 28. Alternative engines may include, for example, an augmentor section among other systems or features. In operation, fan section 22 can drive fluid (e.g., air) along a bypass flowpath B while compressor section 24 can drive air along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. High speed spool 32 may comprise an outer shaft 50 that interconnects a high pressure compressor 52 and high pressure turbine 54. A combustor 56 may be located between high pressure compressor 52 and high pressure turbine 54, In various embodiments, engine casing structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The fluid along core flowpath C may be compressed by low pressure compressor 44 and high pressure compressor 52, mixed and burned with fuel in combustor 56, then expanded through the high pressure turbine 54 and low pressure turbine 46. Turbines 46, 54 rotationally drive the respective low speed spool 30 and high speed spool 32 in response to the expansion.

Each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis A-A'.

Figure 2:
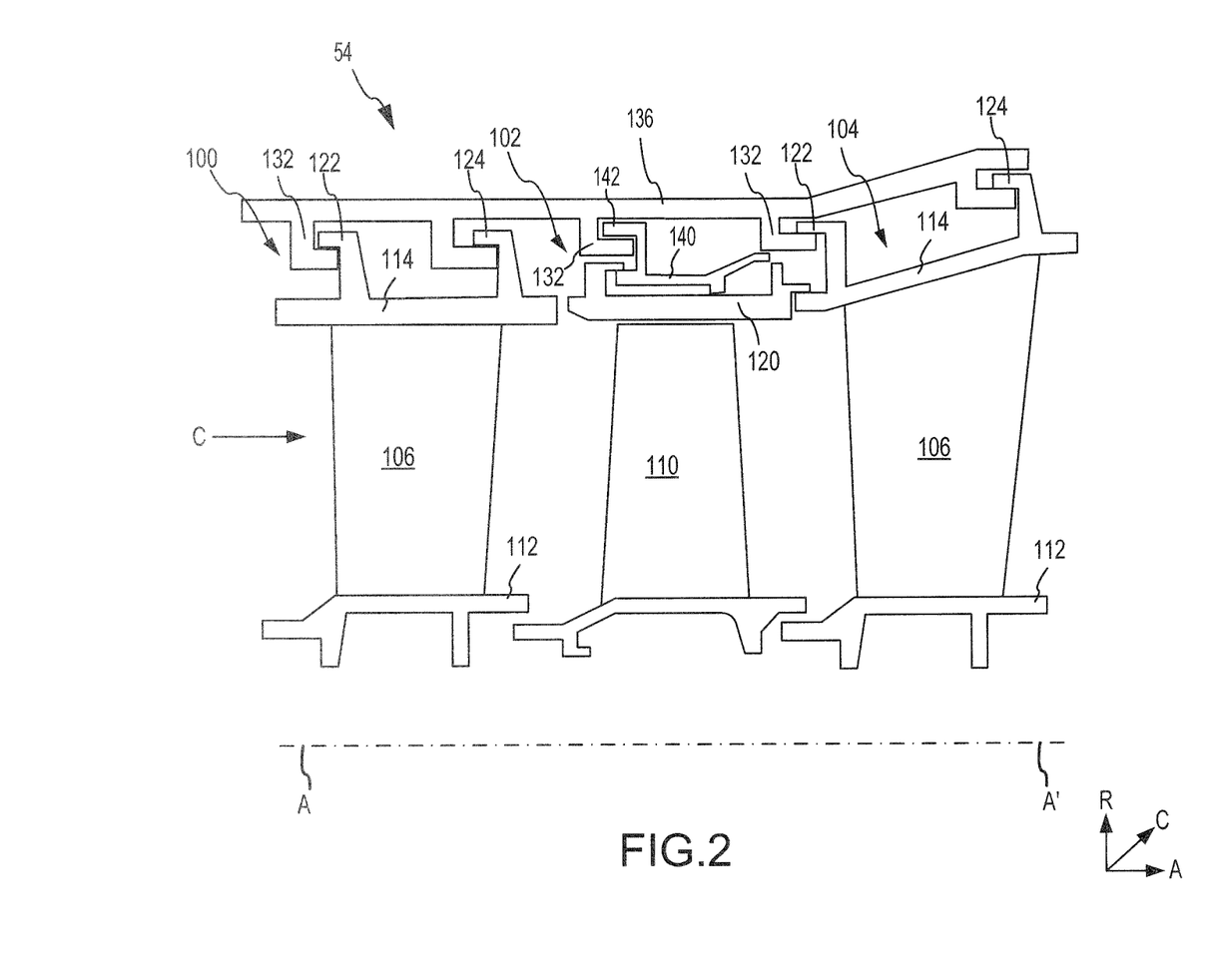
FIG. 2 illustrates a schematic cross-section of a portion of a high pressure turbine section of the gas turbine engine of FIG. 1, in accordance with various embodiments.

FIG. 2 shows a portion of high pressure turbine 54, in accordance with various embodiments. In various embodiments, high pressure turbine 54 may include a first non-rotating member or vane assembly 100, a rotating member or blade assembly 102, and a second non-rotating member or vane assembly 104. Vane assemblies 100 and 104 each include a plurality of vanes 106 positioned about engine central longitudinal axis A-A' and adjacent to the one or more blades 110 of blade assembly 102. Each vane 106 may extend between an inner vane platform 112 and an outer vane platform 114. Vane assemblies 100 and 104 comprise static structures that do not rotate relative to engine central longitudinal axis A-A'. Vane assemblies 100 and 104 may help direct the flow of fluid (e.g., airflow along core flowpath C) to and from blade assembly 102.

Blade assembly 102 may include a plurality of blades 110 configured to rotate about engine central longitudinal axis A-A', in response to receiving a flow of fluid (e.g., air) from combustor section 26 (FIG. 1). Power from the flow may be converted to mechanical power, or torque, by blades 110. In various embodiments, blade assembly 102 may be a first or forward-most stage of rotating blades in high pressure turbine 54. Stated differently, high pressure turbine 54 may comprise a plurality of stages of rotating blades located axially along engine central longitudinal axis A-A', and blade assembly 102 may be located closest axially to combustor section 26 (FIG. 1).

Blade assembly 102 includes a blade outer air seal (BOAS) 120 disposed radially outward from blades 110. BOAS 120 is configured to provide a seal and reduce or prevent hot gases from leaking outside the core flowpath C. In various embodiments, BOAS 120 may be segmented. For example, BOAS 120 may comprise a plurality of arcuate segments, as discussed in further detail below, arranged in circumferential series around engine central longitudinal axis A-A'.

Figure 3:
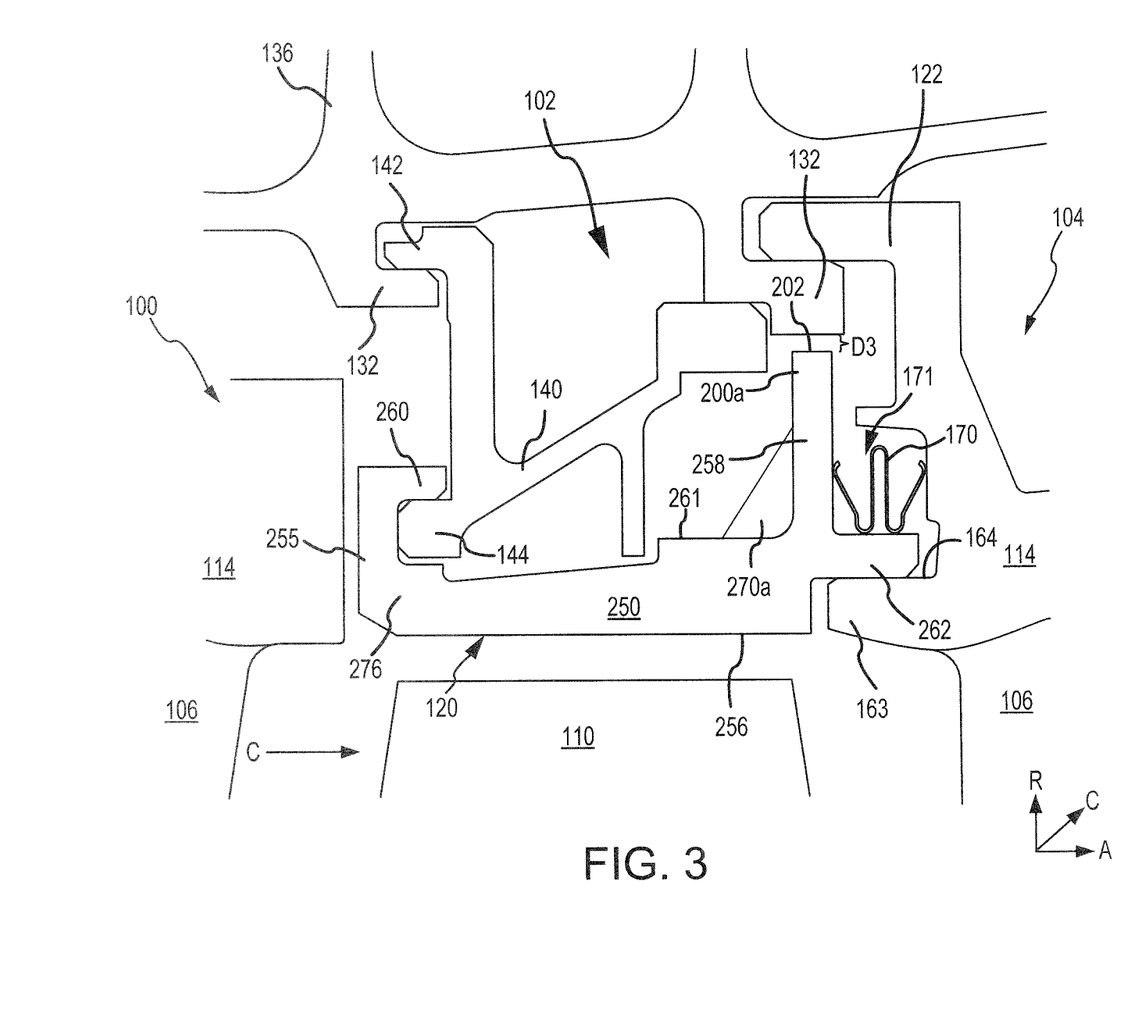
FIG. 3 illustrates a schematic cross-section of a BOAS at an interface between a blade assembly and a vane assembly of the high pressure turbine section of the gas turbine engine of FIG. 1, in accordance with various embodiments.
Figure 4A:
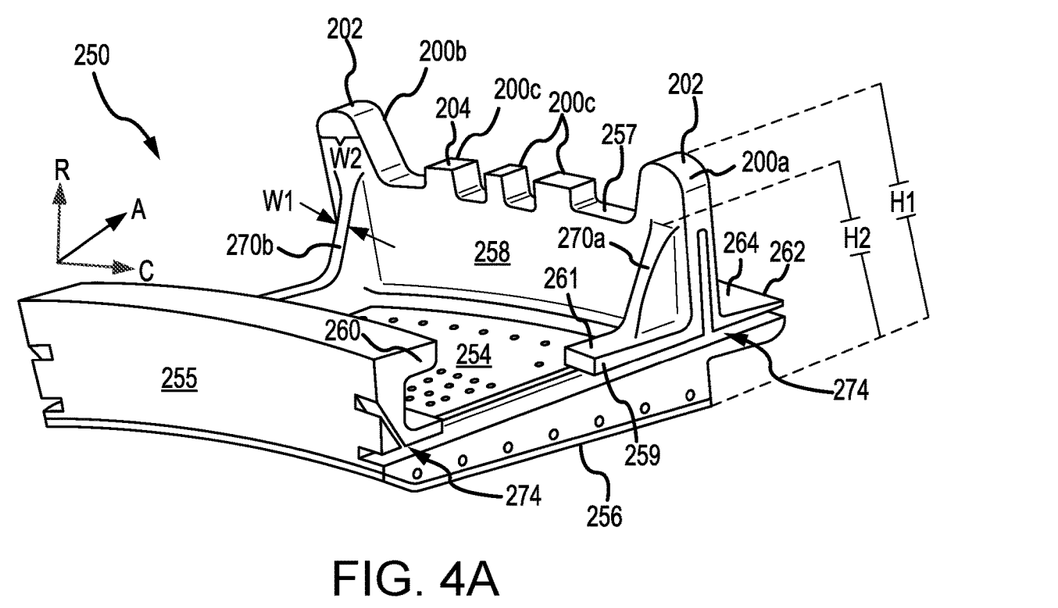
FIGS. 4A and 4B illustrate perspective views of a BOAS segment, in accordance with various embodiments.
Figure 4B:
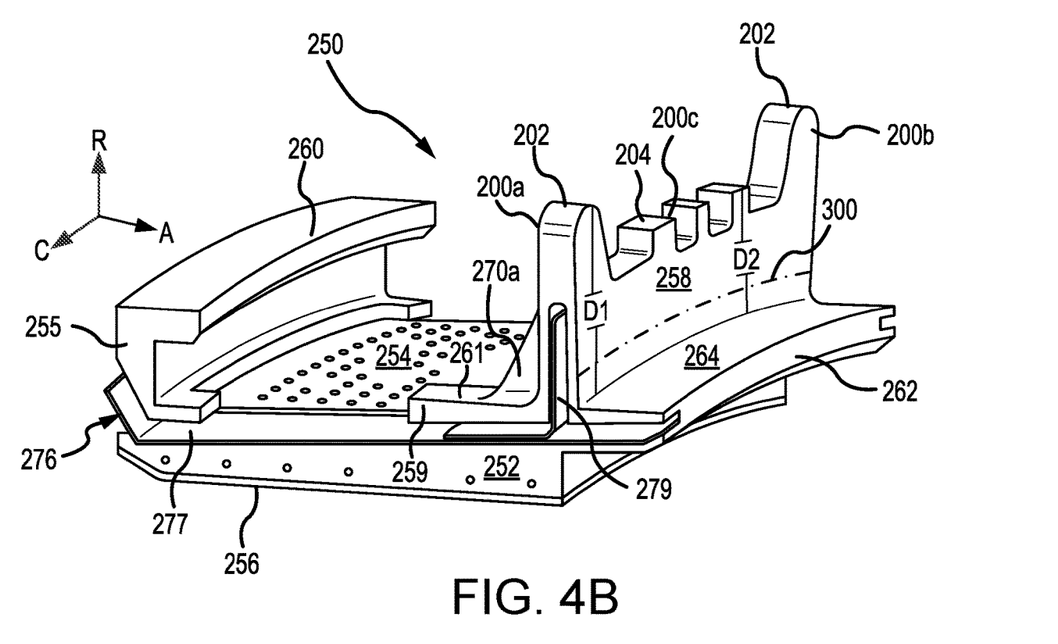

With reference to FIGS. 4A and 4B, an arcuate segment 250 of BOAS 120 is illustrated, in accordance with various embodiments. Arcuate segment 250 may comprise a radially outward surface 254 and a radially inward surface 256. Radially inward surface 256 is oriented toward blades 110, with momentary reference to FIG. 3, and may comprise a gas path surface (i.e., a surface oriented toward the combustion gases in core flowpath C). Radially outward surface 254 is opposite radially inward surface 256 and is oriented away from blades 110. In various embodiments, radially outward surface 254 may be part of a cover plate attached to arcuate segment 250. Arcuate segment 250 further comprises a forward wall 255 extending radially outward at a forward end of arcuate segment 250, and an aft wall 258 extending radially outward at an aft end of arcuate segment 250. Arcuate segment 250 also included circumferential surfaces 252 extending radially between radially outward surface 254 and radially inward surface 256, and axially between forward wall 255 and aft wall 258. Circumferential surfaces 252 may be oriented toward the arcuate segments circumferentially adjacent to arcuate segment 250. A forward hook 260 may extend aft from forward wall 255. An aft hook 262 may extend aft from aft wall 258. Forward legs, or protrusions, 259 may extend forward from aft wall 258. In various embodiments, legs 259 may be located proximate the circumferential ends of aft wall 258

Aft wall 258 may include a plurality of radially extending protrusions, or posts, 200a, 200b, and 200c extending from a radially outward surface 257 of aft wall 258. Protrusions 200a and 200b may be located at the circumferential ends of aft wall 258. Protrusions 200c may be located along radially outward surface 257, between protrusions 200a and 200b. Protrusions 200a and 200b may extend further radially than protrusions 200c. Stated differently, a radial height H1 of protrusions 200a and 200b, as measured from radially inward surface 256, is greater than a radial height of protrusions 200c as measure from radially inward surface 256. Stated yet another way, a radial distance D1 between a radially outward surface 264 of aft hook 262 and a radially outward surface, or peak, 202 of protrusions 200a and 200b is greater than a radial distance D2 between radially outward surface 264 and a radially outward surface 204 of protrusions 200c.

In various embodiments, a gusset 270a may extend from protrusion 200a of aft wall 258, and gusset 270b may extend from protrusion 200b of aft wall 258. Gusset 270a may extend between protrusion 200a and a radially outward surface 261 of legs 259. Gusset 270b may extend between protrusion 200b and radially outward surface 261. Gussets 270a and 270b may provide support and/or reduce vibration of protrusions 200a and 200b. In various embodiments, a radial height H2 of gussets 270a and 270b, as measured from radially inward surface 256, may be between 40% and 80% of the radial height H1 of protrusions 200a and 200b. In various embodiments, the radial height H2 of gussets 270a and 270b may be between 50% and 70% of the radial height H1 of protrusions 200a and 200b. In various embodiments, the radial height H2 of gussets 270a and 270b may be between 55% and 65% of the radial height H1 of protrusions 200a and 200b.

In various embodiments, a circumferential width W1 of gussets 270a and 270b may be between 10% and 100% of a circumferential width W2 of protrusions 200a and 200b. In various embodiments, the circumferential width W1 of gussets 270a and 270b may be between 20% and 60% of the circumferential width W2 of protrusions 200a and 200b. In various embodiments, the circumferential width W1 of gussets 270a and 270b may be between 25% and 35% of the circumferential width W2 of protrusions 200a and 200b.

Figure 5:
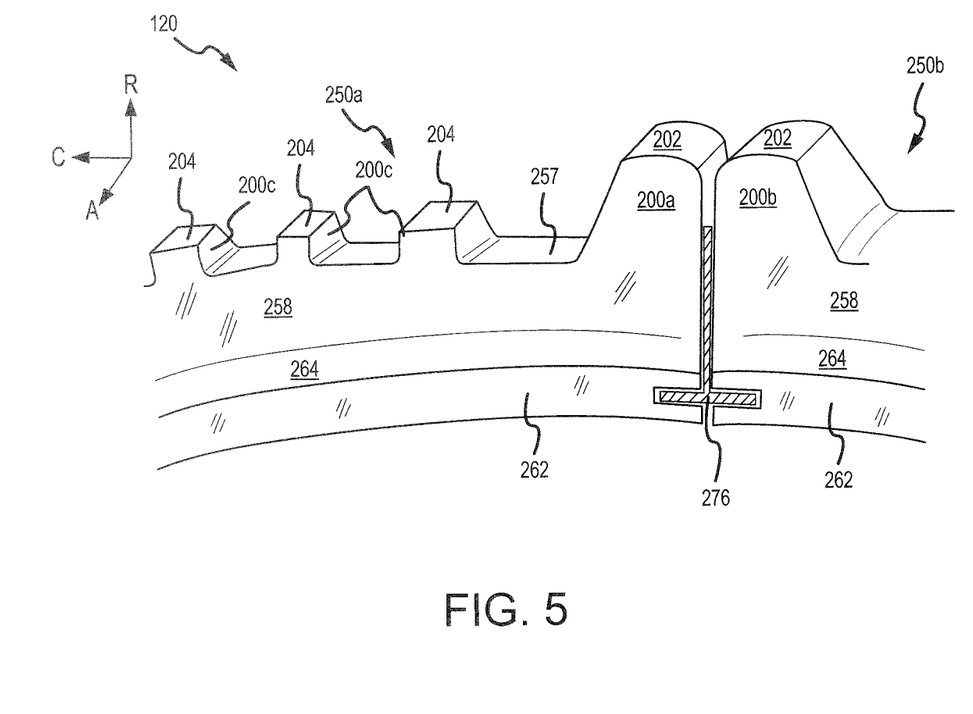
FIG. 5 illustrates a forward looking view of adjacent segments of a BOAS, in accordance with various embodiments.

Referring to FIG. 4A, in various embodiments, a feather seal slot, or groove, 274 may be formed in arcuate segment 250. Feather seal slot 274 may be defined, at least partially, by forward wall 255, circumferential surface 252, aft wall 258, and aft hook 262. Feather seal slot 274 may be configured to receive a feather seal 276, with momentary reference to FIG. 4B. Feather seal slot 274 may extend between circumferentially adjacent arcuate segments of BOAS 120. For example, with reference to FIG. 5, a first arcuate segment 250a may be circumferentially adjacent to a second arcuate segment 250b. First arcuate segment 250a and second arcuate segment 250b may be similar to arcuate segment 250 in FIGS. 4A and 4B. The circumferential end of first arcuate segment 250a is circumferentially adjacent to the circumferential end of second arcuate segment 250b. In this regard, radially extending protrusion 200a of first arcuate segment 250a is circumferentially adjacent to radially extending protrusion 200b of second arcuate segment 250b. Feather seal 276 may be located between first arcuate segment 250a and second arcuate segment 250b. Feather seal 276 may decrease and/or block fluid flow between first arcuate segment 250a and second arcuate segment 250b. In various embodiments, with reference to FIG. 4B, feather seal 276 may comprise a first seal portion 277 and a second seal portion 279. First seal portion 277 may extend axially between forward wall 255 and aft hook 262. Second seal portion 279 extends radially from first seal portion 277 toward radially outward surface 202. In various embodiments, second seal portion 279 may comprise an "L" shape.

In various embodiments, first seal portion 277 and a second seal portion 279 may be integral to one another (i.e., feather seal 276 may be a unibody structure). In various embodiments, first seal portion 277 and second seal portion 279 may be discrete components, with second seal portion 279 disposed on and/or mounted to first seal portion 277.

Returning to FIG. 2, vane assemblies 100 and 104 and blade assembly 102, including BOAS 120, and may be disposed radially inward of a turbine casing structure 136. Turbine casing structure 136 may form a portion of engine casing structure 36 (FIG. 1). The turbine casing structure 136 includes a plurality of case hooks 132. Case hooks 132 may be segmented (i.e., may not span a full circumference) or a full circumferential hoop. BOAS 120 and vane assemblies 100 and 104 may be connected to turbine casing structure 136 via case hooks 132. For example, vane assemblies 100 and 104 may each include a forward vane hook 122 and an aft vane hook 124. Forward vane hook 122 and aft vane hook 124 may be configured to engage case hooks 132. Blade assembly 102 may comprise a BOAS support 140 located between turbine casing structure 136 and BOAS 120. BOAS support 140 may be configured to couple BOAS 120 to turbine casing structure 136. In various embodiments, BOAS support 140 may include a BOAS hook 142 configured to engage case hooks 132 and secure BOAS 120 to turbine casing structure 136.

FIG. 3 shows addition detail of an interface between blade assembly 102 and vane assemblies 100 and 104, in accordance with various embodiments. BOAS 120 may comprise a plurality of arcuate segments, similar to arcuate segment 250 in FIGS. 4A and 4B. Forward hook 260 may extend aft from forward wall 255. Forward hook 260 may be configured to engage a rail 144 of BOAS support 140. Aft hook 262 may extend aft from aft wall 258. Aft hook 262 may engage a protrusion, or rail, 163 at a forward end of outer vane platform 114. Stated differently, aft hook 262 may be located on a surface 164 of protrusion 163.

Aft hook 262 may be located radially inward (i.e., closer to engine central longitudinal axis A-A') as compared to the aft hooks of conventional BOAS. In other words, aft hook 262 may be located closer to radially inward surface 256 as compared to conventional BOAS. With reference to FIG. 4B, in various embodiments, a radially outward surface 264 of aft hook 262 may be located radially inward of a midpoint 300 of aft wall 258, the midpoint 300 of aft wall 258 being half way between radially outward surface 204 of protrusions 200c and radially inward surface 256. With combined reference to FIG. 3 and FIG. 4A, locating aft hook 262 closer to radially inward surface 256 may allow aft hook 262 to contact surface 164 of outer vane platform 114, and define a radially inward portion of a seal cavity 171. In this regard, a seal 170 (e.g., a W-seal) may be located on radially outward surface 264 of aft hook 262. Locating seal 170 on aft hook 262, as opposed to on surface 164 of outer vane platform 114, tends to decrease a deterioration rate of seal 170. Stated differently, locating seal 170 on aft hook 262 tends to increase a reliability and life span of seal 170.

Protrusion 200a and may be a radial distance D3 from a case hook 132 of turbine casing structure 136. In various embodiments, radial distance D3 may less than 0.050 inches (0.127 cm). In various embodiments, radial distance D3 may be less than 0.04 inches (0.101 cm). Distance D3 may be determined by tolerance stacking and the associated clearance for assembly; thus, D3 may vary depending on the specifications of each particular gas turbine engine. With combined reference to FIG. 3 and FIG. 4A, the radial distance D3 between case hook 132 and radially outward surface 202 of protrusions 200a and 200b is less than a radial distance between case hook 132 and radially outward surface 204 of protrusions 200c. Extending the protrusions 200a and 200b on the circumferential ends of aft wall 258 radially outward minimizes a distance between protrusions 200a and 200b and case hooks 132. Minimizing the distance between protrusions 200a and 200b and case hooks 132 allows the engine casing structure (e.g., turbine casing structure 136) to support BOAS 120 and limit translation of BOAS 120 should a radially outward load to be applied to BOAS 120, for example, by a blade 110 liberation or foreign object debris ingestion.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A blade outer air seal, comprising:
a plurality of arcuate segments, wherein a first arcuate segment of the plurality of arcuate segments comprises:
   a first wall located at an aft end of the first arcuate segment, the first wall comprising a first radially extending protrusion located at a first circumferential end of the first wall, a second radially extending protrusion located at a second circumferential end of the first wall opposite the first circumferential end, and a plurality of third radially extending protrusions disposed between the first radially extending protrusion and the second radially extending protrusion, wherein a radial height of the first radially extending protrusion and the second radially extending protrusion as measured from a radially inward surface of the first arcuate segment is greater than a radial height of the third radially extending protrusions as measured from the radially inward surface of the first arcuate segment;
   a first hook extending aft from the first wall, wherein a radially outward surface of the first hook is radially inward of a midpoint of the first wall, the midpoint of the first wall being located halfway between the radially inward surface of the first arcuate segment and a radially outward surface of the third radially extending protrusions; and
   a first gusset extending from the first radially extending protrusion.

2. The blade outer air seal of claim 1, wherein a radial height of the first gusset as measured from the radially inward surface of the first arcuate segment is between 50% and 70% of the radial height of the first radially extending protrusion as measured from the radially inward surface of the first arcuate segment.

3. The blade outer air seal of claim 1, wherein a circumferential width of the first gusset is between 20% and 40% of a circumferential width of the first radially extending protrusion.

4. The blade outer air seal of claim 1, wherein the first arcuate segment further comprises:
   a second wall located at a forward end of the first arcuate segment; and
   a second hook extending from the second wall.

5. The blade outer air seal of claim 4, wherein the first arcuate segment further comprises a feather seal slot defined, at least partially, by the first wall, the second wall, and a circumferential surface extending between the first wall and the second wall.

6. The blade outer air seal of claim 5, wherein a second arcuate segment of the plurality of arcuate segments is disposed circumferentially adjacent to the first arcuate segment, and wherein an aft wall of the second arcuate segment comprises a fourth radially extending protrusion located at a circumferential end of the aft wall of the second arcuate segment, and wherein the fourth radially extending protrusion is circumferentially adjacent to the first radially extending protrusion.

7. The blade outer air seal of the claim 6, further comprising a feather seal disposed between the first arcuate segment and the second arcuate segment.

8. A gas turbine engine, comprising:
an engine casing structure; and
a turbine disposed radially inward of the engine casing structure, the turbine comprising:
   a blade configured to rotate about a central longitudinal axis of the gas turbine engine, and
   a blade outer air seal disposed radially outward of the blade, the blade outer air seal comprising an arcuate segment, wherein a first radial distance between the engine casing structure and a first protrusion extending from an aft wall of the arcuate segment is less than a second radial distance between the engine casing structure and a second protrusion extending from the aft wall, wherein the arcuate segment includes a hook extending from the aft wall of the arcuate segment, and wherein a radially outward surface of the hook is radially inward of a midpoint of the aft wall of the arcuate segment, the midpoint being located halfway between a radially inward surface of the arcuate segment and a radially outward surface of the second protrusion.

9. The gas turbine engine of claim 8, wherein the first protrusion is located proximate a circumferential end of the arcuate segment.

10. The gas turbine engine of claim 8, wherein the blade outer air seal further comprises a gusset extending from the aft wall.

11. The gas turbine engine of claim 10, wherein a radial height of the gusset as measured from the radially inward surface of the arcuate segment is between 50% and 70% of a radial height of the first protrusion as measured from the radially inward surface of the arcuate segment.

12. A turbine for a gas turbine engine, comprising:
a blade;
a blade outer air seal disposed radially outward of the blade, the blade outer air seal comprising an arcuate segment, the arcuate segment including:
   an aft wall comprising a first radially extending protrusion and a second radially extending protrusion, the first radially extending protrusion being located proximate a circumferential end of the aft wall, and
   an aft hook extending aft from the aft wall, wherein a radially outward surface of the aft hook is radially inward of a midpoint of the aft wall, the midpoint of the aft wall being located halfway between a radially inward surface of the arcuate segment and a radially outward surface of the second radially extending protrusion; and
a turbine case disposed around the blade outer air seal, the turbine case comprising a case hook, wherein a first radial distance between the case hook and the first radially extending protrusion is less than a second radial distance between the case hook and the second radially extending protrusion.

13. The turbine of claim 12, wherein the blade outer air seal further comprises a gusset extending from the first radially extending protrusion.

* * * * *